(12) United States Patent
Rhee et al.

(10) Patent No.: US 7,074,510 B2
(45) Date of Patent: Jul. 11, 2006

(54) COMPOSITE ION-EXCHANGE MEMBRANE, FABRICATION METHOD OF THE SAME, AND MEMBRANE-ELECTRODE ASSEMBLY, AND POLYMER ELECTROLYTE FUEL CELL HAVING THE SAME

(75) Inventors: Hee-Woo Rhee, Seoul (KR); Min-Kyu Song, Seoul (KR); Young-Taek Kim, Gyeonggi-do (KR); Seung Bae Park, Seoul (KR); Jin Ho Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 11/027,328

(22) Filed: Dec. 29, 2004

(65) Prior Publication Data

US 2005/0170229 A1 Aug. 4, 2005

(30) Foreign Application Priority Data

Dec. 30, 2003 (KR) ............... 10-2003-0100130

(51) Int. Cl.
*H01M 8/10* (2006.01)
(52) U.S. Cl. .................... 429/30; 429/249; 429/41
(58) Field of Classification Search .............. 429/251, 429/218.1, 30, 44, 249
See application file for complete search history.

(56) References Cited

U.S. PATENT DOCUMENTS

| 3,953,566 | A | | 4/1976 | Gore |
| 3,962,153 | A | | 6/1976 | Gore |
| 5,091,087 | A | | 2/1992 | Calundann et al. |
| 5,525,436 | A | | 6/1996 | Savinell et al. |
| 5,531,899 | A | * | 7/1996 | Yen et al. ............... 210/638 |
| 5,547,551 | A | | 8/1996 | Bahar et al. |
| 5,599,614 | A | | 2/1997 | Bahar et al. |
| 5,599,639 | A | | 2/1997 | Sansone et al. |
| 5,635,041 | A | | 6/1997 | Bahar et al. |
| 5,919,583 | A | * | 7/1999 | Grot et al. ............... 429/33 |
| 6,187,231 | B1 | | 2/2001 | Sansone et al. |
| 6,749,749 | B1 | * | 6/2004 | Xie et al. ............. 210/198.2 |
| 2004/0209136 | A1 | * | 10/2004 | Ren et al. ............... 429/30 |

FOREIGN PATENT DOCUMENTS

JP 11-116679 4/1999
WO WO-00/77874 6/2000

* cited by examiner

*Primary Examiner*—Patrick Joseph Ryan
*Assistant Examiner*—Ben Lewis
(74) *Attorney, Agent, or Firm*—Peter F. Corless; Edwards Angell Palmer & Dodge LLP

(57) ABSTRACT

The present invention relates to a composite ion-exchange membrane that can exhibit good conductivity at high temperatures, methods to produce the polymer membrane, membrane-electrode assemblies that comprise one or more of such polymers, and polymer electrolyte fuel cells that comprise one or more of such electrode assemblies.

14 Claims, 4 Drawing Sheets

COMPOSITE ION-EXCHANGE MEMBRANE, FABRICATION METHOD OF THE SAME, AND MEMBRANE-ELECTRODE ASSEMBLY, AND POLYMER ELECTROLYTE FUEL CELL HAVING THE SAME

CROSS-REFERENCE TO RELATED APPLICATIONS

This application claims priority of Korean Application No. 10-2003-0100130, filed on Dec. 30, 2003, the disclosure of which is incorporated fully herein by reference.

FIELD OF THE INVENTION

The present invention relates in a preferred aspect to a composite ion-exchange-type membrane that can exhibit high temperature conductivity, a fabrication method for such membrane, a membrane-electrode assembly using the membrane, and a polymer electrolyte fuel cell comprising such a membrane.

In particularly preferred aspects, the invention relates to a composite polymer ion-exchange-type membrane, a fabrication method of such a membrane, a membrane-electrode assembly fabricated by a composite ion-exchange membrane, and a polymer electrolyte fuel cell comprising the membrane, wherein the a composite ion-exchange membrane is formed or is obtainable by steps comprising mixing an anion exchange resin with a porogen material, and the porogen material is removed such as by extraction to thereby provide pores in the anion exchange resin.

BACKGROUND OF THE INVENTION

Generally, a fuel cell is formed in a structure where a proton conductivity polymer membrane is disposed between a fuel cell electrode (anode) and an oxide electrode (cathode). As shown in FIG. 1, a proton conductivity polymer membrane 11 is formed of a solid polymer with a thickness of 20~200 μm. The anode and a cathode are formed of a gas spreading electrode (hereinafter, anode and cathode may be referred to as gas spreading electrode) formed of supports 14 and 15 capable of supplying a reaction gas, respectively, and catalyst layers 12 and 13 capable of achieving an oxidation and a reduction of a reaction gas. In FIG. 1, reference numeral 16 refers to a cathode plate having a reaction gas injection groove and having a function of a current collector.

Electricity can be generated in a fuel cell as follows. Hydrogen gas, a fuel gas as shown in the following Reaction 1, is supplied to an anode, which is a fuel electrode and is absorbed by a platinum catalyst, so that proton and electrons are generated based on an oxidation reaction. At this time, the electrons are transferred to the cathode, an oxidation electrode, along the external circuit. The protons are transferred to the cathode through a polymer electrolyte membrane.

In another principle, as shown in the following Reaction 2, the oxygen molecules receive electrons from the cathode and are reduced to oxygen ions. The reduced oxygen ions and protons are reacted for thereby generating electricity.

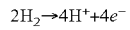  [Reaction 1]

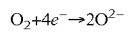

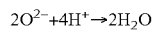  [Reaction 2]

Although the fuel cell electrolyte membrane is as an insulator capable of electrically separating the anode and the cathode, it also serves as a medium capable of transferring protons from an anode to a cathode during a cell operation. In addition, it serves to separate a reaction gas or a liquid. Therefore, the fuel cell electrolyte membrane should maintain proton conductivity in a wide range of temperatures, exhibit electrical and chemical stability and should minimize ohmic loss at high current densities. Further, the electrolyte membrane should have good resolution performance of a reaction during a fuel cell operation. A certain level of mechanical properties and dimensional stability also can be required for stacking construction.

The perfluorosulfonic acid resin of Nafion™ that has been widely used as a fuel cell electrolyte membrane has a poly(tetrafluoroethylene) (PTFE) backbone. Nafion™ is a proton exchange resin having sulfonic groups. When over 20 wt % of such a polymer is hydrated, $-SO_3H$ of a resin branch is dissociated to thereby obtain higher proton conductivity (~0.1 S/cm at 25° C.). High mechanical properties, anti-chemical properties and electrical and chemical stability thereby can be obtained.

However, in a thin membrane state in which an area resistance is minimized, dimensional stability, mechanical properties and resolution ability of reaction material are concurrently decreased, which can decrease fuel cell performance.

In addition, since it is possible to restrict platinum catalyst absorption of carbon monoxide included in fuel, the efficiency of a fuel cell system can be enhanced by increasing a reaction speed at high temperatures. Therefore, a high temperature operation method is preferred for development of large or medium size type polymer electrolyte fuel cell for home and electric vehicle use. However, at above 100° C., a rapid increase of membrane resistance of Nafion™ by moisture evaporation allows an operation of proton exchange membrane fuel (PEMFC) to be performed within a boiling point of water. Therefore, development and actual use of a next generation type electrolyte membrane having excellent high temperature conductivity and moisture condition are needed. In order to achieve the above development and actual use, various electrolyte matrixes and organic and inorganic additives have been reported.

U.S. Pat. Nos. 5,547,551, 5,599,614, and 5,635,041 report methods for fabricating reinforced composite membrane (product name: Gore-Select) as an electrolyte membrane where a proton exchange resin in a liquid state is impregnated into extended porous polytetrafluoroethylene (see U.S. Pat. Nos. 3,953,566 and 3,962,153). The fuel cell electrolyte membrane fabricated by the above methods may have a lower conductivity ($\Omega^{-1}$ $cm^{-1}$) as compared with Nafion™, but these materials maintain a desired mechanical strength and dimensional stability of a porous polymer support for thereby achieving a thin membrane with a size of about 25 μm. The conductivity ($\Omega^{-1}$ $cm^{-2}$) of such a fabricated composite electrolyte membrane is considered to be excellent as compared with Nafion™.

However, in such a fabricated composite polymer electrolyte membrane, the thickness of the membrane is decreased to about 25 μm in order to enhance the ion conductivity, so that tear strength becomes relatively low. In this case, it is necessary to fully impregnate expensive porous polytetrafluoroethylene support with an 80% porous ratio into a Nafion™ resin. This results in increased fabrication costs. In addition, since the proton exchange resin must be repeatedly impregnated into polytetrafluoroethylene film with a relatively low wettability, the fabrication process is performed rather slowly and non-continuously.

U.S. Pat. No. 5,525,436 reports method for fabricating an electrolyte membrane where a solvent is evaporated from polybenzimidazole solution and is doped with a strong acid such as sulfuric acid and dried. In U.S. Pat. Nos. 5,091,087, 5,599,639 and 6,187,231, polyamide is coated on polybenzimidazole, and a composite film is fabricated by a compression molding method. Thereafter, polyamide is extracted using a solvent such as dichloromethane, and then a porous polybenzimidazole film is fabricated. An electrolyte membrane may be fabricated by performing a doping process using strong acid. In another method, polybenzimidazole solution doped with strong acid is solidified in a liquid bath with a non-solvent or a mixture of a non-solvent and a solvent for thereby fabricating an electrolyte membrane.

In addition to the above methods, there are electrolyte membranes fabricated where a polymer such as polyphosphazene (WO 00/77874), polyethersulfon (Japan patent laid-open No. 11-116679), polyether-etherketone and poly(4-phenoxybenzoyl-1,4-phenylene) is sulfonated and added with organic or inorganic ion conductive agents.

In a certain method for maintaining a desired conductivity of an electrolyte membrane at high temperatures, the use of an organic or inorganic hydrophilic additive having an excellent coupling force has been attempted. It has been reported that an ion or dipole of a heteropoly acid compound of phosphotungstic acid (PTA) is strongly coupled with proton and inhibits moisture evaporation at high temperature. [S. Malhotra, R. Datta, J. Electrochem. Soc., 144 L23 (1977)]. However, that PTA is a water soluble substance, so that it may be extracted to the outside of a fuel cell due to mass transport of moisture generated during a cell operation.

It also has been reported to substitute moisture with a proton acceptor in an electrolyte membrane using an organic solvent having a low volatility. The moisture has a high dielectric constant as Bronsted base, so that it can easily dissociate —$SO_3H$. Since moisture is a by-product of a fuel cell reaction, it is necessary to use moisture with a proton exchange membrane. At present, certain studies for fabricating an electrolyte membrane comprising phosphoric acid, imidazole, butyl methyl imidazolium triflate, butly methyl imidazolium tetra fluoro bonate, etc. are under progress. [1: R. Savinell, et al., J. Electrochem. Soc., 141, L46 (1994); 2: K. D. kreuer, A. Fuchs, M. Ise, M. Sapeth. J. Mater. Electrochem. Acta, 43, 1281 (1998)].

A water non-soluble solid proton conductor of ion transfer without moisture has been investigated. Workers in the United States and Japan as well as in other countries have concentrated their studies on fabricating a composite electrolyte membrane ($CsHSO_4$, $Zr(HPO_4)_2$) that is added to a proton exchange resin. [S. M. Haile, D. A. Yoysen, C. R. I. Chisolm, R. B. Merle, Nature, 410. 910(2001)]

In attempted methods where $CsHSO_4$ or $Zr(HPO_4)_2$ is admixed in a Nafion™ solution and the solvent is dried, a large amount of inorganic additive of a high density is non-uniformly distributed on the Nafion™ membrane. An adhering force with respect to a polymer matrix becomes low, and brittleness is increased. In a composite electrolyte membrane method according to U.S. Pat. No. 5,919,583, a Nafion™ membrane is swelled in $ZrOCl_3$ water solution and is processed with phosphoric acid solution, so that a fine powder type $Zr(HPO_4)_2$ is formed in Nafion™ membrane.

However, in that case, the dissociated $Zr^{4+}$ ion is formed in a hydrophilic region of hydrated Nafion™ membrane or a surface region of the same, and the added amount of $Zr(HPO_4)_2$ is limited to about 20 wt %, thus limiting the formation of ion conduction mechanism based on a physical contact with inorganic additives.

The information set forth in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

In one aspect, the present invention relates to a composite ion-exchange membrane that can exhibit high temperature conductivity, a fabrication method of the same, a membrane-electrode assembly using the same, and a polymer electrolyte fuel cell having the same.

In a preferred aspect, the invention includes composite ion-exchange-type membranes that can provide high temperature conductivity and good mechanical properties, dimensional stability and fuel resolution performance of a thin film state to maintain nano-sized solid proton conductor.

In additional preferred aspects, the invention includes increasing the amount of a solid proton conductor in an anion exchange polymer up to 20, 25, 30 or 40 wt % or more based on the polymer weight, which can enhance coupling and distributing properties of the polymer.

In yet further preferred aspects, methods and systems of the invention may provide high temperature conductivity mechanism based on a physical contact between organic materials.

In additional preferred aspects, the invention provides methods and systems to fabricate a composite ion-exchange membrane that comprises a solid proton conductor having a nano size or micro size on a polymer membrane using a porogen wherein the solid proton conductor is at least substantially uniformly formed.

Particularly preferred methods and systems of the invention can provide a composite ion-exchange membrane that is capable of maintaining excellent proton conductivity even at high temperature operation of a fuel cell that comprises the membrane, e.g. where the fuel cell is operated at 80° C., 90° C. or 100° C. or more.

Particularly preferred methods and systems of the invention also can provide a composite ion exchange membrane that has a high electrochemical stability and a minimal ohmic loss at a high current density.

Particularly preferred methods and systems of the invention also can provide a composite ion-exchange membrane and a membrane-electrode assembly adapting the same and a fuel cell that has an excellent resolution performance of a reaction material during a cell operation.

Preferred composite ion-exchange membranes of the invention may comprise a solid proton conductor of about 5 to about 70 wt % based on weight of the membrane distributed preferably at least substantially uniformly and preferably in a powder form in a matrix comprising from about 30 to about 95 wt % based on weight of the membrane of one or more ion exchange resins having one or more proton exchange groups suitably as branch or pendant moieties.

Preferred ion-exchange fabrication methods may suitably comprise: a) preparing an ion exchange resin solution with a density of from about 0.5 to about 30 wt % by admixing an ion exchange resin comprising one or more proton exchange groups in a solvent component which may preferably comprise one or more organic solvents; b) forming a polymer membrane by mixing porogen in the ion exchange resin solution preferably with energy input such as ultrasonic waves; c) forming pores in the polymer membrane such as by extracting the porogen from the polymer membrane; and d) charging solid proton conductor into the membrane pores preferably whereby about 5 to about 70 wt % of the solid proton conductor based on membrane weight is distributed with respect to about 30 to about 95 wt % of the ion exchange resin based on membrane weight.

The invention also includes fuel cells that comprise one or more of the disclosed composite ion-exchange membranes.

Other aspects of the invention are discussed below.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Figure 1:
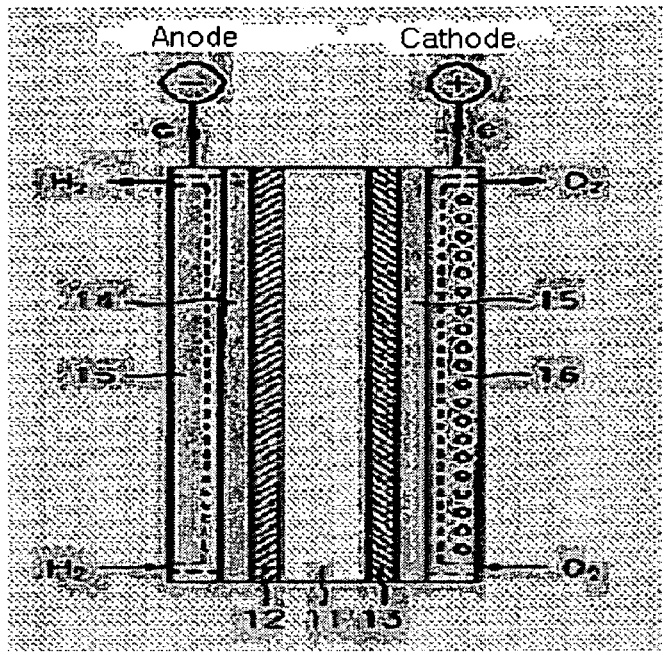
FIG. 1 shows a view illustrating a structure of a proton conductivity polymer membrane fuel cell.

As discussed above, the invention includes a composite ion-exchange membrane useful in fuel cells. Preferred ion-exchange membranes may comprise a solid proton conductor of 5 to 70 wt % based on weight of the membrane in (i.e. admixed with) with one or more ion-exchange resins that comprise proton exchange groups, wherein the one or more ion-exchange resins are present in an amount of 30 to 95 wt % based on membrane weight.

In another aspect, the invention includes a composite ion-exchange membrane useful in fuel cells, wherein the composite ion-exchange membrane comprises one or more ion-exchange resins comprising native pores and pores formed by porogens and removal thereof as disclosed herein, and solid proton conductor present in (i.e. admixed with) both native pores and pores formed by porogens of the one or more ion-exchange resins. As referred to herein, the term "native pores" of an ion-exchange resin are those pores that are present in the ion-exchange resin without the porogen treatment as disclosed herein. Thus, an ion-exchange resin treated in accordance with the invention may have two distinct types of pores: i) pores that are formed through the porogen treatment and removal process as disclosed herein, and ii) pores ("native pores") that exist in the ion-exchange resin even in the absence of the porogen treatment. In this aspect of the invention, in such composite ion-exchange membrane, preferably solid proton conductor is present in an amount of 5 to 70 wt % based on weight of the membrane and the one or more ion-exchange resins are present in an amount of 30 to 95 wt % based on membrane weight.

The invention also includes methods for producing composite ion-exchange membranes, which may suitably comprise: A) mixing one or more ion exchange resins with porogen material. The ion exchange resins suitably may have a density of 0.5 to 30 wt % and comprise one or more proton exchange groups. The porogen and ion exchange resin(s) may be suitably admixed in one or more organic solvents; B) Thereafter, the porogen material may be removed to form pores in the one or more ion exchange resins; C) Admixing proton conductor with the one or more porous ion exchange resins. Preferably for many applications, the pores are nanosized, e.g. preferably the pores formed in the one or more ion exchange resins have a maximum pore size of about 1,000 nm or less, more preferably a maximum pore size of about 100 nm, and preferably the pores formed in the one or more ion exchange resins have a mean pore diameter of less than about 50, more preferably a mean pore size of about 1 to about 10 nm, more preferably a mean pore size of about 2 to about 5 nm.

Embodiments of the present invention particularly preferred for many applications are set forth hereunder.

In a preferred aspect of the present invention, a proton exchange resin is dissolved or otherwise dispersed in one or more organic solvents with a predetermined concentration and a hydrophobic porogen is mixed the resin preferably with energy input such as agitation and preferably ultrasonic waves, so that a polymer membrane formed of proton exchange resin and hydrophobic porogen is formed. References herein to "dissolved" or "dissolving" or other similar term are inclusive of dispersing the material in a second material such as the resin and/or porogen being dispersed in the solvent component. The porogen is removed such as extraction, so that pores are formed in a hydrophobic region(s) of the proton exchange region. As mentioned above, porogen material is preferably employed of a size sufficient so that upon removal nanoscale pores (e.g., preferably a mean pore diameter of less than about 50 nanometers) are provided in the protein exchange resin. High temperature wettability can be enhanced in the entire hydrophilic and hydrophobic regions of the proton exchange resin by adding proton conductor material to the resin pores.

The components and fabrication method of a composite ion-exchange membrane according to the present invention will be described with reference to the accompanying drawings.

In suitable composite ion-exchange membranes according to the present invention, about 5 to about 40 wt % of a solid proton conductor is intensively and uniformly distributed in a matrix formed of about 60 to about 95 wt % of proton exchange resin having one or more proton exchange groups.

Particularly preferred proton exchange resins according to the present invention suitably have one or more proton exchange groups which may be suitably present as branch or pendant moieties, or otherwise be present in the resin.

Suitable proton exchange groups suitably may include one or more of a sulfonic acid group, a carboxylic acid group, a phosphoric acid group, a phosphonic acid or a derivative of the same.

It is preferable to use the proton exchange region having an ion exchange rate of about 3 to about 33. As referred to herein, the ion exchange rate is defined based on the numbers of carbons of polymer backbone and proton exchange groups. The ion exchange rate corresponds to about 700 to about 2000 equivalent weight (EW). It is possible to adjust the conductivity of proton exchange region based on the equivalent weight. If the ion exchange rate of the proton exchange resin used is less than 3, the desired mechanical property may be compromised, while if the ion exchange rate exceeds 33, the electric resistance is increased to undesirable levels.

As a typical example of the proton exchange resin, there are Nafion™ of E.I. Dupont de Nemours, Flemion of Asahi Glass KK, and Aciplex of Asahi chemical industry (U.S. Pat. Nos. 3,282,875, 4,329,435, 4,330,654, 4,417,969, 4,610,762, 4,433,082, and 5,094,995. In addition, other suitable proton exchange resins are disclosed in U.S. Pat. No. 5,596,676 of Imperial Chemical Industries PLC, and U.S. Pat. No. 4,940,525 of Dow Chemical Co.

The Nafion™ that is most generally used has the following structural formula with $(CF)_{18-28}SO_3H$.

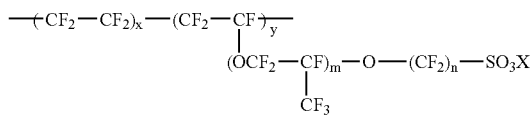

wherein in that depicted structure, X represents H, Li, Na, K or $NR^1R^2R^3R^4$, and $R^1R^2R^3$ and $R^4$ are H, $CH_3$ or $C_2H_5$, and m is an integer same or greater than 1, and n is 2, and x is real number of 5 to 13.5, and y is integer above 1000. The Nafion™ has a Michel type structure when sulfonic acid group of an end of chain is hydrated. Namely, there is provided a passage for proton transfer like a transfer of typical aqueous solution.

In suitable composite ion-exchange membranes according to the present invention, the proton exchange resin suitably may be used in a type of a single material or a composite material. Preferably, if a composite in employed, the composition contains one or more proton exchange resins in amount of from about 30 to 95 wt % based on total membrane material, more preferably from about 40 to about 90 wt % and more preferably about 50 to about 85 wt % based on total membrane material. If the amount of proton exchange resin used is less than 30 wt % of the total membrane material, the desired mechanical property of the membrane may be decreased, and when the amount of proton exchange resin exceeds 95 wt %, the high temperature conductivity of the membrane (e.g. conductivity at fuel cell operation at or in excess of about 80° C., 90° C. or 100° C.) may be relatively decreased.

When a composite ion-exchange membrane according to the present invention is used at a temperature greater than 100° C. as a hydrophilic inorganic material of a macro powder type, a solid proton conductivity material may be employed to avoid a decrease of the proton conduction property of the proton exchange resin and to maximizing wettability of a high composite polymer ion-exchange filtration membrane wherein the proton conduction property is decreased as moisture is evaporated. At this time, the solid proton conduction material preferably in a powder phase of form with a diameter of about 10 to about 500 nm after a doping reaction is performed. As the solid proton conduction material is dispersed in the proton exchange resin, it is possible to increase a transfer site and or moisture site of proton.

In particular, especially suitable solid proton conduction materials may include one or more materials selected from the group consisting of zirconium hydrogen phosphate, $Zr(O_3PC_2H_5)_{1.15}Y_{0.85}$, $Zr(O_3PCH_2OH)_{1.27}Y_{0.73}\cdot nH_2O$, $(P_2O_5)_4(ZrO_2)_3$ glass, $P_2O_5$—$ZrO_2$—$SiO_2$ glass, $CsDSO_4$, $\beta$-$Cs_3(HSO_4)_2(HN(P,S)O_4)$, $\alpha$-$Cs_3(HSO_4)_2(H_2PO_4)$, $CsHSO_4$, $Ba_2YSnO_{5.5}$, $SnO_2\cdot 2H_2O$, $Sb_2O_5\cdot 5.4H_2O$, $H_2Ti_4O_9\cdot 1.2H_2O$, $HUO_2AsO_4\cdot 4H_2O$, $HUO_2PO_4\cdot 4H_2O$, $H_3Sb_3P_2O_{14}\cdot 10H_2O$, $HSbP_2O_8\cdot nH_2O$, $H_2Sb_4O_{11}\cdot 3H_2O$ and $HSbO_3\cdot 2H_2O$. In certain preferred systems, a zirconium phosphate having a low water solubility and a cesium sulfate compound may be used. The solid proton conductor has 5 to 70 wt %, preferably, 10 to 60 wt % and more preferably 15 to 50 wt %. The above range of the same may be properly changed based on the purpose of use. At this time, when the total amount of the solid proton conductor is less than 5 wt %, the ion conductivity of a composite polymer ion-exchange filtration membrane is significantly decreased at high temperature of above 100° C. When it exceeds 70 wt %, the brittleness of a composite polymer ion-exchange membrane may occur, so that mechanical strength is decreased.

In addition, a solid proton conductor may be carried in a support such as silica, clay, alumina, mica, and zeolite. Various known methods may be employed for applying the conductor on such a support. The support suitably may be employed in varying amounts including from about 5 to about 50 wt % based on the solid proton conductor. Additionally, in the case that proton exchange resin is dispersed in a type that a solid proton conductor is carried by the support, the amount of use is preferably about 5 to 100 wt % with respect to the support. Use of a support also may enhance desired mechanical properties of the membrane system. Some especially suitable supports may include e.g. silica (fumed silica, product name: Aerosil Cab-o-sil), clay (montmorillonite, saponite, hectorite, laponite, tetrasiliic mica, etc.), alumina or zeolite, product name: SAPO-5, XSM-5, AlPO-5, VPI-5 and MCM41).

Preferred ion-exchange composite membranes of the invention suitably may have a thickness of about 10 to about 250 μm. These preferred thicknesses are less than the thickness of electrolyte membranes employed in conventional fuel cell.

Preferred methods for fabricating a composite ion-exchange membrane according to the present invention will be described.

First, an ion exchange resin having one or more proton exchange groups suitably as branch or pendant moieties is dissolved or otherwise dispersed in one or more organic solvents, so that an ion exchange resin solution with a concentration of about 0.5 to about 30 weight % based on total solution weight is provided. When the concentration of the proton exchange resin exceeds the above preferred concentration range, viscosity may increase to a level that deteriorates processing. The organic solvent suitably may be one or more of 2-prophanol (IPA), N-methyl-2-pyrrolidone (NMP), dimethylformamide (DMF), dimethylaceteamide (DMA), tetrahydrofuran (THF), dimethylsulfoxide (DMSO), acetone, methylethylketone (MEK), tetramethyl urea, trimethyl phosphate, butyrolactone, isophorone, carbitol acetate, methyl isobutyl ketone, N-butyl acetate, cyclohexanone, diacetone alcohol, diisobutyl ketone, ethyl acetoacetate, glycol ether, propylene carbonate, ethylene carbonate, dimethylcarbonate, and diethylcarbonate. In one suitable system, a commercially available proton exchange resin is dissolved or otherwise dispersed in distilled water and alcohol, for example, distilled water/2-propanaol, and then the that distilled water and alcohol are evaporated.

Next, in preferred methods, a porogen material is mixed with ion exchange resin solution preferably with energy inputted to enhance the mixing such as ultrasonic waves or energy to thereby form a polymer membrane. If ultrasonic energy is employed, suitably the ultrasonic energy has a wavelength of about 5 to about 20 KHz. Use of ultrasonic energy in excess of that range can undesirably degrade the polymer.

Preferred porogen materials include hydrophobic materials that can be removed from the polymer by low temperature and solvent extraction after being uniformly distributed in the proton exchange resin. As suitable hydrophobic porogen materials, oligomers of low molecular weight, polymer beads, organic liquids, etc. may be used.

Particularly preferred porogen materials to be used may be one or more materials selected from the group consisting of polycaprolactone, polystyrene, propylene carbonate, ethylene carbonate, dimethylcarbonate, diethylcarbonate, dibutyl phthalate, dioctyl phthalate, dissooctyl phthalate, diheptylnonyl phthalate, tritolyl phospate and dioctyl adipate. Dibutyl phthalate fabricated by Eastman, etc. is preferably used for many systems. The porogen is suitably used in an amount of e.g. about 5 to 120 wt %, 10 to 120 wt %, more preferably 15 to 100 wt % with respect to the weight of a polymer composite membrane. Such porogen amounts may be adjusted based on the purpose of use. When the amount porogen material used is less than about 5 wt % relative to the polymer membrane material, the physical site for the charging of the solid proton conductor is decreased, and the amount of additives is decreased. When the amount of porogen material used exceeds about 150 wt % relative to the polymer membrane material, the desired mechanical properties of the ion-exchange composite membrane of a polymer may be decreased.

The porogen material is suitably coated on a substrate such as a glass plate after it is mixed with proton exchange resin and is then dried e.g. in an oven at a temperature of 80 to 100° C.

Next, pore formation step is suitably performed wherein the porogen material is removed such as by extraction from the polymer membrane. In at least some suitable methods, porogen may be removed from the polymer membrane by extraction, e.g. by agitating the polymer membrane in one or more agents selected from the group consisting of acetone, methanol, ethanol, dimethylether and diethylether, e.g. for more than 24 hours. Thereafter, the polymer membrane material may be dried and rinsed with distilled water to provide the polymer with pores.

In a further step, a solid proton conductor is filled in polymer pores. In this step, a solid proton conductor is filled so that a solid proton conductor of 5 to 70 wt % based on weight of the resulting membrane is dispersed in one or more proton exchange resins present in 30 to 95 wt % based on weight of the resulting membrane. One or more of the above-described solid proton conductor materials may be suitably used. In this exemplary embodiment, the use of zirconium phosphate will be described. First, the polymer membrane comprising pores formed in the above process is processed in $ZrOCl_2$ aqueous solution at 80° C. for 12 hours, and $Zr^{4+}$ proton is doped on the pores, and the phosphorous solution of 80° C. is processed for more than 12 hours to thereby generate zirconium phosphate. At this time, the formed zirconium phosphate is uniformly distributed on a hydrophilic cluster region of proton exchange resin as well as a hydrophobic region formed by the porogen.

Selectively, after the doping step of the solid proton conductive member is performed, a commercial proton exchange resin or a blend solution of a universal type polymer resin e.g. selected from one or more of a proton exchange resin, polyvinylidenfluoride, polyvinylfluoride, polyimide and polyvinylchloride having a high resolution of a reaction gas is additionally coated on a surface of the composite polymer ion-exchange membrane and is dried for thereby adjusting a resolution with respect to gas and liquid fuel.

Preferred ion-exchange composite membranes according to the present invention can be well adapted to a polymer electrolyte fuel cell. In more detail, preferred composite electrolyte membranes of the invention can exhibit excellent mechanical properties at thickness less than a conventional Nafion™ membrane. In addition, the amount of ion exchange resin employed can be decreased, and the fabrication cost of the fuel cell can be significantly decreased. Since a high temperature operation is enhanced, a catalyst error due to carbon monoxide among fuels can be avoided. As a consequence, electric chemical reaction speed can be enhanced to thereby improve the system efficiency. In addition the use of catalyst can be decreased, so that total costs can be reduced.

Fuel cells of the invention can be constructed by known methods and by incorporating a composite ion-exchange membrane as disclosed herein.

Preferred fuel cells of the invention that include a composite ion-exchange membrane can be constructed in a stacked structure wherein a plurality of membrane-electrode assemblies are stacked. For example, preferred stacking structures may include a sequence of current collector/anode/composite polymer electrolyte membrane/cathode/current collector/anode/composite polymer electrolyte membrane/cathode/current collector. The fuel cell assemblies may further include a terminal connected for supplying fuel and oxidation agent to the anode and cathode, and a cell casing for sealing and covering the stacked assembly.

The present invention will be described in more detail with reference to the following examples, however, they should not be construed as limiting the scope of the present invention.

EXAMPLE 1

Fabrication of Composite Ion-exchange Membrane

Nafion™/$H_2O$/2-propanol(solution technology Inc. EW=1.100) solution of 5 wt % is agitated for 48 hours at a room temperature, and solvent is evaporated to thereby produce about 5 g (grams) of Nafion™ gel, and 95 g of dimethylaceteamide (DMA) is added, so that Nafion™/DMA solution of about 5 wt % is provided.

This solution is preheated for 24 hours in water at 60° C. to thereby evaporate remaining moisture. Dibutylphthalate (DBP) of 2 g is added to Nafion™/DMA solution 100 and is mixed by exposure to ultrasonic waves of 5 to 20 KHz. The thusly fabricated mixed solution is coated on a glass plate and is heated in an oven at 100° C. to thereby fabricate a polymer membrane having a thickness of about 50 μm.

The polymer membrane is admixed in a solution of methanol/diethylether (1:1 vol %) for 24 hours, and solvent is exchanged to thereby remove the DBP component and form nano-sized pores. Thereafter, the polymer membrane is rinsed using methanol and distilled water.

The Nafion™ membrane is processed with 1M zirconium chloride solution of 80° C. for 12 hours, and $Zr^{4+}$ ions are introduced into the polymer membrane and is re-processed with 1M phosphorous solution at 80° C. to thereby fabricate a polymer nano-filtration composite membrane charged with zirconium phosphate of nano size in Nafion™ membrane.

Figure 2:
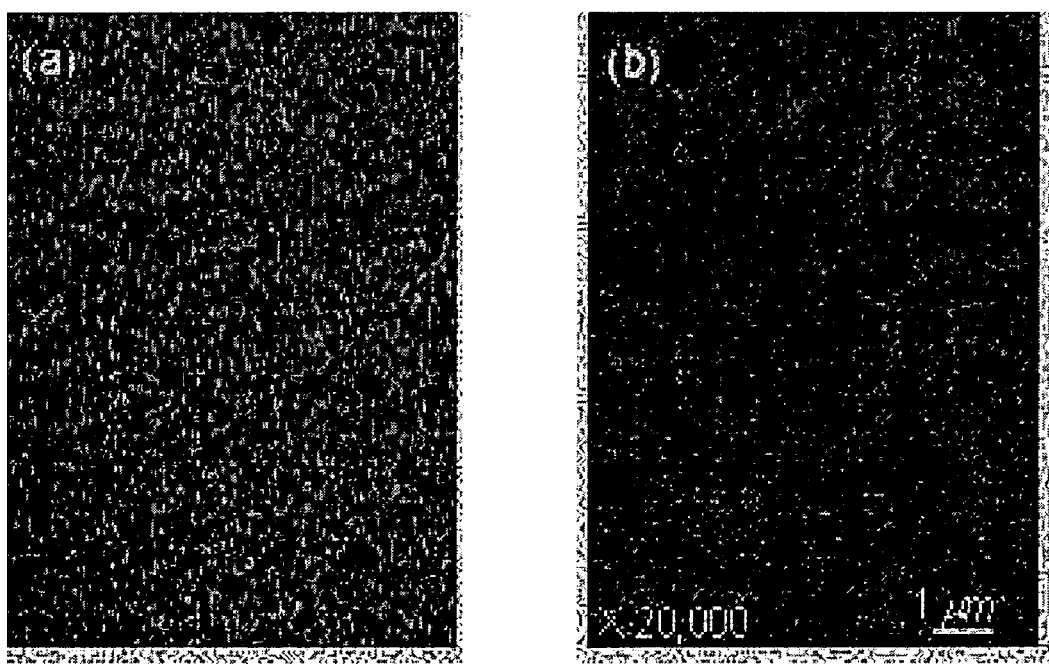
FIGS. 2A shows a scanning electron micrograph (SEM) picture of a nano pore generated due to an extraction of a porogen.
FIG. 2B shows a SEM picture of a pore blockage due to a charge of a solid proton conductivity.

FIG. 2 is a SEM picture of nano pores "a" generated after porogen is extracted, and nano pores blocked by charge of solid proton conductor (zirconium phosphate).

COMPARATIVE EXAMPLE 1

Nafion™ 111 (EW=1100, thickness=~180 μm) fabricated by Dupont company is processed in hydrogen peroxide at 100° C. for 3 hours. Pollutants are removed from the surface of Nafion™ 117. The Nafion™ 117 is processed using 1M sulfuric acid at 100° C. for 2 hours and is stored in deionized water. The physical property and cell performance of the fabricated Nafion™ 117 are evaluated in the same manner as example 1 above.

COMPARATIVE EXAMPLE 2

Nafion™ 117 is processed with zirconium chloride and phosphorus acid in the same manner as example 1 above, and zirconium phosphate is stored in proton exchange resin. The physical property of the fabricated composite electrolyte membrane and cell performance are evaluated in the same manner as example 1 above.

EXPERIMENT EXAMPLE

The proton conductivity of a high nanofiltration composite membrane and composite electrolye membrane fabricated based on the examples 1 and comparative examples 1 and 2 above are measured by current interruption method.

Specifically, alternating current is applied to both ends of a test piece having a size of 1×5 cm and a thickness of 30~50 μm. The alternating current (AC) is applied in a chamber with controlled temperature and moisture, and a difference of AC is measured at a center of the test piece to thereby obtain proton conductivity measurements.

In addition, the mechanical property of the fabricated composite polymer electrolyte membrane is evaluated based on ASTM-638 or ASTM-882. The test machine parameters for this evaluation is as follows.

| | |
|---|---|
| Cross head speed: 25 cm/min | grip distance: 6.35 cm |
| Temperature: 25° C. | Humidity: 50% |

Figure 3:
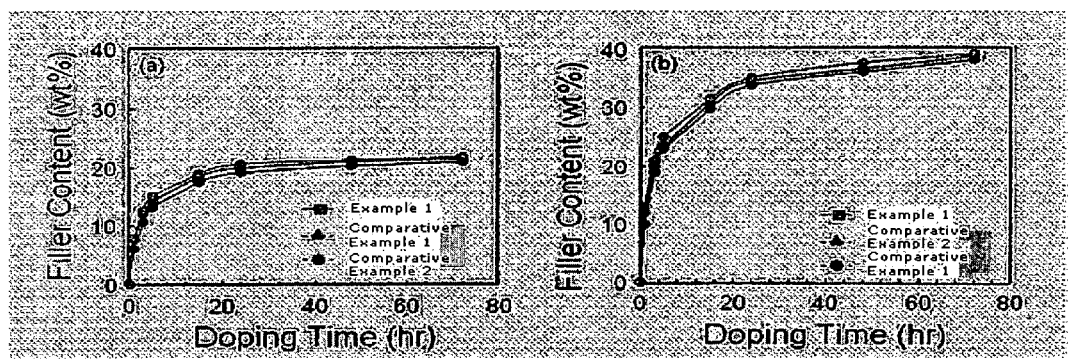
FIG. 3A shows a graph of a charging degree of a zirconium phosphate based on a Comparative Example 2 which follows.
FIG. 3B shows a graph of a charging degree of a zirconium phosphate based on Example 1 which follows.

FIG. 3 illustrates the amount of solid proton conductor charged in the membrane fabricated in the example 1 and Comparative Example 1. As shown therein, the charging degree is increased more than two times.

Figure 4:
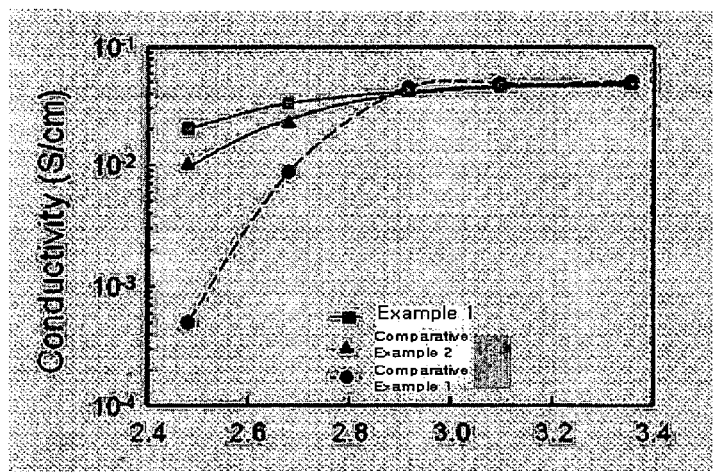
FIG. 4 shows a graph of a temperature dependence of a composite ion-exchange membrane according to Example 1 and Comparative Examples 1 and 2 which follow.

FIG. 4 illustrates ion conductivity based on the temperatures of the membranes fabricated in the example 1 and comparative examples 1 and 2. In the case of the example 1, it is shown that the ion conductivity is high irrespective of the temperature.

In the case of the Nafion™ 117, the conductivity sharply decreases at a temperature higher than 80° C., and but in the case of the fabricated composite membrane of the invention, the conductivity is slightly decreased at a temperature higher than 80° C. Therefore, it is shown that as the amount of the solid proton conductor of the invention is increased, the decreasing degree of conductivity is reduced.

Figure 5:
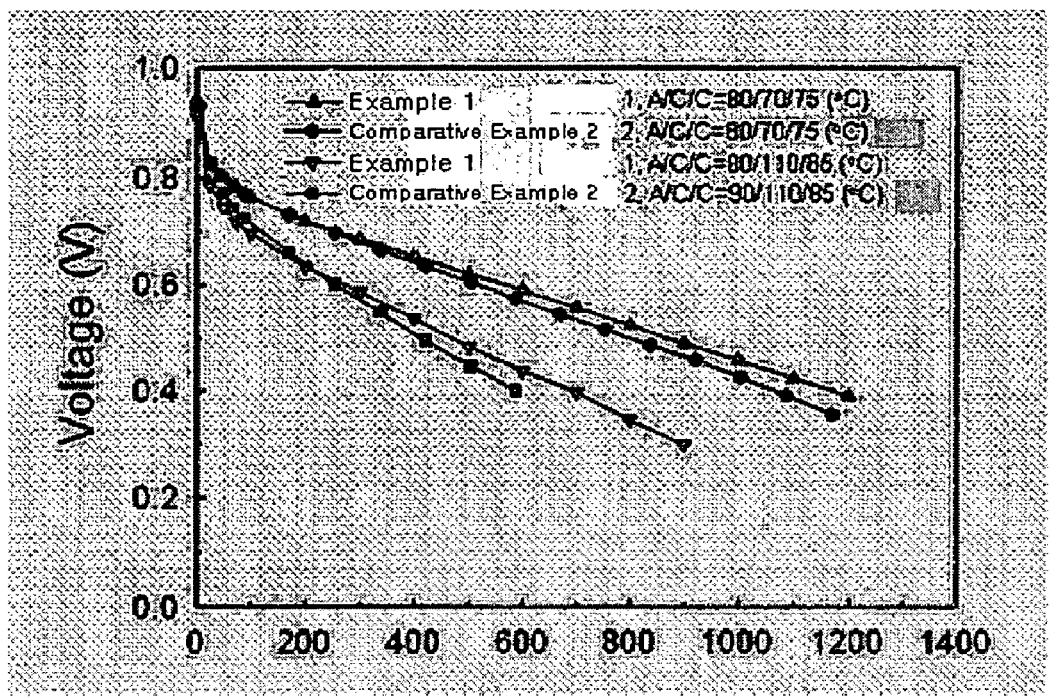
FIG. 5 shows a graph of a temperature-based cell performance of a composite ion-exchange membrane.

FIG. 5 is a current-to-voltage curve based on the temperature of the fuel cell with respect to the membranes fabricated in example 1 and comparative examples 1 and 2. In the case that the operation temperature of the cell is 70° C., the voltage is increased a the same current density, and in the case that the operation temperature of the cell is 110° C., the maximum current density of the Comparative Example 2 is 100 mA/cm². In the case of the example 1, it is increased to 900 mA/cm².

Figure 6:
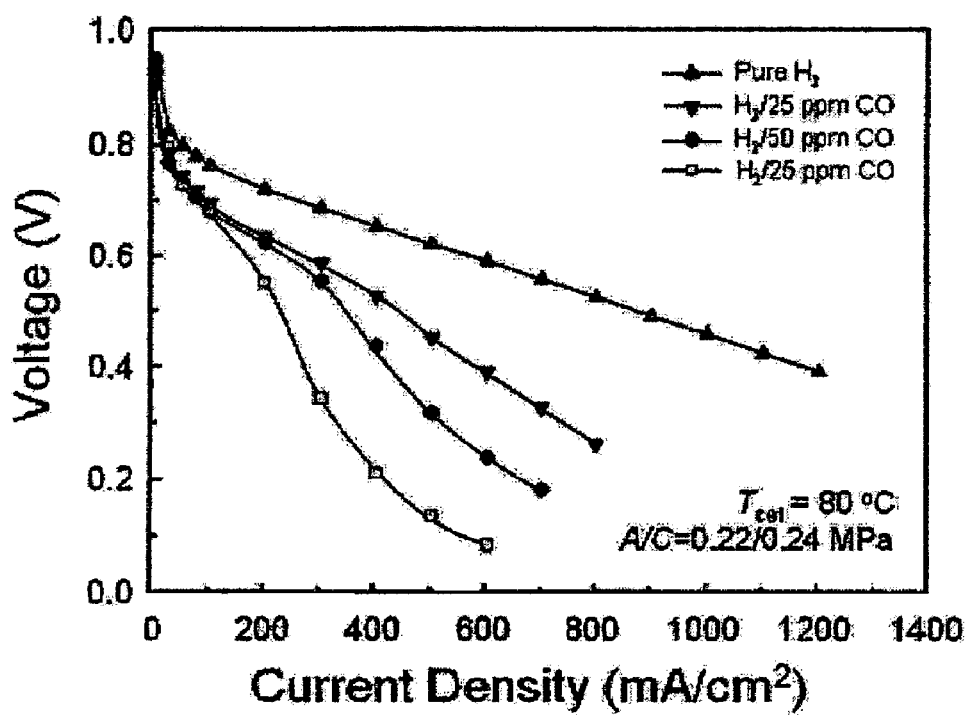
FIG. 6 shows a graph of a cell performance of a composite ion-exchange membrane based on a carbon monoxide density at 80° C. according to an embodiment 1 according to the present invention.
Figure 7:
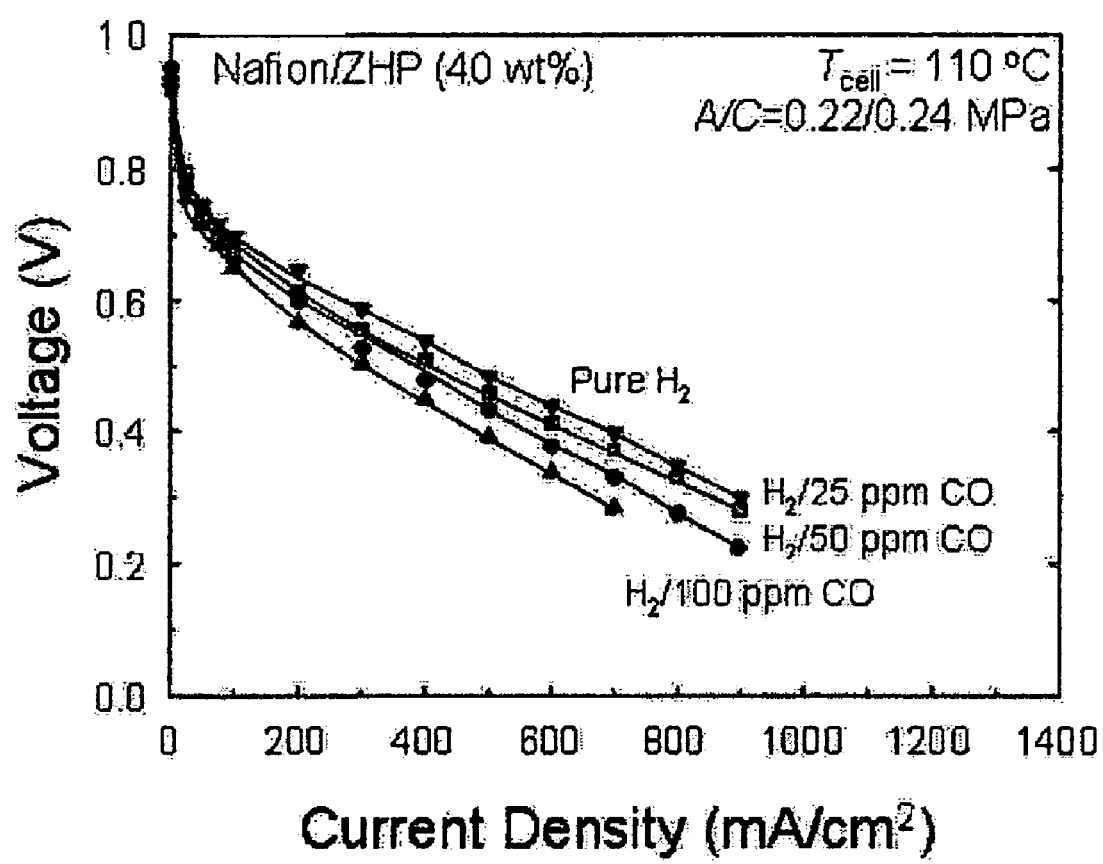
FIG. 7 shows a graph of a cell performance of a composite ion-exchange membrane based on a carbon monoxide at 110° C. according to an embodiment 1 of the present invention.

FIGS. 6 and 7 are current-to-voltage corves based on the temperature of the fuel cell and concentration of carbon monoxide according to the example 1 above. As shown in FIG. 6, in the case that the operation temperature of the cell is 80° C., the maximum current density of the cell is decreased by 50% from 1200 mA/cm² to 600 mA/cm² based on the amount of carbon monoxide. In the case that the operation temperature of the cell is 110° C., it is shown that the maximum current density of the cell is not changed based on the amount of carbon monoxide as compared with the example of FIG. 6.

EXAMPLE 2

Fabrications of Membrane-electrode Assembly and Fuel Cell

A commercially available catalyst electrode layer is coated on both sides of the composite polymer nanofiltration membrane and composite electrolyte membrane fabricated in example 1 and comparative examples 1 and 2 above based on a hot-pressing method to thereby fabricate a membrane-electrode assembly (MEA).

Nafion™/2-propanol solution of 1 wt % is sprayed to both sides of the composite polymer nanofiltration membrane for achieving a smooth junction with electrode before the hot-pressing is performed and is dried at a room temperature to thereby form a Nafion™ layer of about 2 μm.

The electrode used for fabricating MEA is ELAT electrode having a single surface fabricated by E-TEK Inc. The support is a plane weave carbon cloth with a thickness of about 0.36 mm, the final thickness of the catalyst layer is about 0.45 mm, and the amount of the catalyst metal is about 0.4 mg/cm². Pt-ru/C alloy catalyst is used for the anode, and Pt/C catalyst is used for the cathode. A 5 wt % solution of Nafion™/$H_2O$/2-propanol solution is brushed before hot-pressing is performed to provide a smooth conduction of proton in an electrolyte and on surface of catalyst in the ELAT electrode. The coated material is dried at 70° C. for 10 minutes, and ion exchange resin of about 0.7 mg/cm² is impregnated.

The coated materials are then hot-pressed at a pressure of about 80 kg/cm² at 140° C. for 5 minutes.

The MEA is engaged to a unit cell of 25 cm² connected with an electric load: Scribner series 890B electronic load. The unit cells are connected with eight pairs of bolts and nuts by a pressure of 30 b-in. A glass fiber (having a thickness of 0.3 mm) coated with non-compressive silicon is sealed at both sides of the membrane during the cell assembling process. High purity hydrogen $H_2$ and oxygen $O_2$ are passed through a humidifier and are saturated by water and are used as fuel and oxidation agents.

EXPERIMENTAL EXAMPLE 2

Performance Evaluation of Fuel Cell

The performance of the fuel cell fabricated based on example 2 above is evaluated at a temperature of 70 to 130° C. until the moisture temperature is maintained at 80° C. with respect to fuel gas and oxidation agent gas. The stoichimetric number of gas flux is fixed at 2.0 at anode and 3.0 at cathode in a condition that the supply pressures of hydrogen and oxygen are 30/30 psig.

As described above, preferred composite polymer filtration membranes of the invention are capable of maintaining excellent proton conductivity and can exhibit excellent electrical chemical stability. Preferred composite polymer ion-exchange membranes of the invention also can exhibit minimal ohmic loss at high current densities. Additionally, dimensional stability and mechanical properties can be excellent for preferred composite polymer ion-exchange membranes of the invention even when the thickness is less than that of conventional electrolyte film in thin film states.

Still further, when particularly preferred composite polymer ion-exchange membranes are employed in a fuel cell, the reaction speed is not significantly decreased even at high temperature operation of the fuel cell, and it is possible to enhance the performance of the fuel cell by limiting the phenomenon that carbon monoxide contained in fuel is absorbed to catalyst.

All documents mentioned herein are fully incorporated herein by reference in their entirety.

While the invention has been described with reference to specific embodiments, modifications and variations of the invention may be constructed with departing from the scope of the invention, which is defined in the following claims.

What is claimed is:

1. A method of fabricating a composite ion-exchange membrane, comprising:
    a) preparing an ion exchange resin solution with a density of 0.5 to 30 wt % by steps comprising admixing an ion exchange resin comprising one or more proton exchange groups in one or more organic solvents;
    b) forming a polymer membrane by mixing in the presence of ultrasonic waves at least one compound selected from the group consisting of polycaprolactone, polystyrene, propylene carbonate, ethylene carbonate, dimethylcarbonate, diethylcarbonate, dibutyl phthalate, dioctyl phthalate, dissooctyl phthalate, diheptylnonyl phthalate, tritolyl phospate and dioctyl adipate as porogen in the ion exchange resin solution;
    c) forming pores by removing porogen from the polymer membrane; and
    d) charging solid proton conductor into the pores whereby 5 to 70 wt % of the solid proton conductor is distributed with respect to 30 to 95 wt % of the ion exchange resin.

2. The method of claim 1, wherein the solid proton conductor in step d) is mixed with 5 to 50 wt % of support selected from the group consisting of one or more of silica, clay, alumina, mica, arid zeolite.

3. The method of claim 1, wherein the composite polymer ion-exchange membrane, after said step d), is coated with a composition comprising one or more resins selected from the group consisting of proton exchange resin, polyvinylidenfluoride, polyvinylfluoride, polyimide and polyvinylchloride.

4. The method of claim 1, wherein porogen is removed by extraction with one or a mixture of solvents selected from the group consisting of 2-propanol (IPA), N-methyl-2-pyrrolidone (NMP), dimethylformamide (DMF), dimethylacetamide (DMA), tetrahydrofuran (THF), dimethylsulfoxide (DMSO), acetone, methylethylketone (MEK), tetramethyl urea, trimethyl phosphate, butyrolactone, isophorone, carbitol acetate, methyl isobutyl ketone, N-butyl acetate, cyclohexanone, diacetone alcohol, diisobutyl ketone, ethyl acetoacetate, glycol ether, propylene carbonate, ethylene carbonate, dimethylcarbonate, and diethylcarbonate.

5. The method of claim 1, wherein porogen removal in step c) comprises extraction with one or a mixture selected from the group consisting of acetone, methanol, ethanol, dimethylether and diethylether.

6. The method of claim 1, wherein the one or more proton exchange groups in step a) are selected from the group consisting of one or more of a sulfonic acid group, a carboxylic acid group, a phosphoric acid group, a phosphonic acid or a derivative of the same.

7. The method of claim 1, wherein the solid proton conductor in step a) has a diameter of 10 to 500 nm.

8. The method of claim 1, wherein the solid proton conductor in step a) is at least one compound selected from the group consisting of zirconium hydrogen phosphate, $Zr(O_3PC_2H_5)_{1.15}Y_{0.85}$, $Zr(O_3PCH_2OH)_{1.27}Y_{0.73}.nH_2O$, $(P_2O_5)_4(ZrO_2)_3$ glass, $P_2O_5$—$ZrO_2$—$SiO_2$ glass, $CsDSO_4$, $\beta$-$Cs_3(HSO_4)_2(HN(P,S)O_4)$, $\alpha$-$Cs_3(HSO_4)_2(H_2PO_4)$, $CsHSO_4$, $Ba_2YSnO_{5.5}$, $SnO_2.2H_2O$, $Sb_2O_5.5.4H_2O$, $H_2Ti_4O_9.1.2H_2O$, $HUO_2AsO_4.4H_2O$, $HUO_2PO_4.4H_2O$, $H_3Sb_3P_2O_{14}.10H_2O$, $HSbP_2O_8.nH_2O$, $H_2Sb_4O_{11}.3H_2O$ and $HSbO_3.2H_2O$ or a mixture of the same.

9. The method of claim 1, wherein the composite polymer filtration membrane has a thickness of 10 to 250 μm.

10. A composite ion-exchange membrane prepared in accordance with the method of any one of claims 1 to 4 and 5.

11. A membrane-electrode assembly fabricated using a composite ion-exchange membrane according to claim 10.

12. A fuel cell fabricated using the membrane-electrode assembly of claim 11.

13. The fuel cell of claim 12, wherein the fuel cell comprises:
    a stacked structure that is sequentially stacked in the order of current collector/anode/composite polymer filtration membrane/cathode/current collector/anode/composite polymer filtration membrane/cathode/current collector;
    a terminal that is connected to the anode and the cathode to supply fuel and oxidizing agent; and
    a cell casing that encompasses and seals the stacked structure.

14. A composite ion-exchange membrane of claim 10, wherein the ion exchange rate of the ion exchange resin is 3 to 33.

* * * * *